US010127396B2

(12) United States Patent
Swaminathan et al.

(10) Patent No.: US 10,127,396 B2
(45) Date of Patent: *Nov. 13, 2018

(54) SYSTEM AND METHOD FOR LOCAL GENERATION OF STREAMING CONTENT WITH A HINT TRACK

(71) Applicant: Adobe Systems Incorporated, San Jose, CA (US)

(72) Inventors: Viswanathan Swaminathan, Saratoga, CA (US); Sheng Wei, Los Angeles, CA (US)

(73) Assignee: Adobe Systems Incorporated, San Jose, CA (US)

( * ) Notice: Subject to any disclaimer, the term of this patent is extended or adjusted under 35 U.S.C. 154(b) by 79 days.

This patent is subject to a terminal disclaimer.

(21) Appl. No.: 14/341,551

(22) Filed: Jul. 25, 2014

(65) Prior Publication Data

US 2014/0337620 A1    Nov. 13, 2014

Related U.S. Application Data

(63) Continuation of application No. 13/563,494, filed on Jul. 31, 2012, now Pat. No. 8,812,839.

(51) Int. Cl.
*H04L 29/06*    (2006.01)
*G06F 21/62*    (2013.01)
(Continued)

(52) U.S. Cl.
CPC ............ *G06F 21/6209* (2013.01); *H04L 9/06* (2013.01); *H04L 65/607* (2013.01);
(Continued)

(58) Field of Classification Search
CPC ... G06F 21/6209; H04L 9/06; H04N 21/2541; H04N 21/2347
(Continued)

(56) References Cited

U.S. PATENT DOCUMENTS 30,126,608        7/2003   Safadi et al.
6,937,730 B1 *    8/2005   Buxton ................ H04N 7/163
                                              348/E7.061
(Continued)

FOREIGN PATENT DOCUMENTS

EP        1936978 A2 *    6/2008    ............. G06F 21/10

OTHER PUBLICATIONS

"Non-Final Office Action", U.S. Appl. No. 13/563,494, dated Jan. 3, 2014, 10 pages.
(Continued)

*Primary Examiner* — Mohammad W Reza
(74) *Attorney, Agent, or Firm* — Wolfe-SBMC

(57) ABSTRACT

Embodiments of a system and method for local generation of streaming content with a hint track are described. Embodiments may include receiving a first version of encrypted content comprising encrypted content samples that each include media content and non-content information. Embodiments may also include receiving a hint track including packet header information for a stream of media packets from which the media content was sourced, and offset information identifying locations of encrypted media content within the encrypted content samples. Embodiments may include generating a second version of the encrypted content for streaming, which may include, based on the information of the hint track, identifying the location of media content within the encrypted content samples. Embodiments may include generating media packets within the second version of the encrypted content, each of those media packets including header information from the hint track and the identified media content from the encrypted content samples.

20 Claims, 7 Drawing Sheets

(51) Int. Cl.
  *H04N 21/2343* (2011.01)
  *H04N 21/2347* (2011.01)
  *H04N 21/2381* (2011.01)
  *H04N 21/254* (2011.01)
  *H04L 9/06* (2006.01)

(52) U.S. Cl.
  CPC ..... *H04N 21/2347* (2013.01); *H04N 21/2381* (2013.01); *H04N 21/23439* (2013.01); *H04N 21/2541* (2013.01)

(58) Field of Classification Search
  USPC ........................................................ 713/160
  See application file for complete search history.

(56) References Cited

U.S. PATENT DOCUMENTS

| | | | |
|---|---|---|---|
| 70,294,170 | | 12/2007 | Vantalon et al. |
| 7,320,069 | B1 | 1/2008 | Sundharraj et al. |
| 7,864,952 | B2* | 1/2011 | Pauker ................ H04L 9/0625 380/28 |
| 7,996,672 | B1 | 8/2011 | Agrawal et al. |
| 8,116,236 | B2 | 2/2012 | Baird et al. |
| 8,812,839 | B2 | 8/2014 | Swaminathan et al. |
| 9,281,941 | B2* | 3/2016 | Gentry ................ H04L 9/008 |
| 2003/0005285 | A1* | 1/2003 | Graunke ............. H04L 9/0838 713/153 |
| 2004/0049694 | A1* | 3/2004 | Candelore .............. H04N 5/783 726/14 |
| 2004/0073917 | A1* | 4/2004 | Pedlow, Jr. ........ H04L 63/0428 725/31 |
| 2009/0003592 | A1* | 1/2009 | Hanai ............................. 380/29 |
| 2010/0161825 | A1* | 6/2010 | Ronca ............. H04N 21/23424 709/231 |
| 2012/0137015 | A1 | 5/2012 | Sun |
| 2012/0173865 | A1 | 7/2012 | Swaminathan |
| 2013/0129085 | A1 | 5/2013 | Swaminathan |
| 2014/0040612 | A1 | 2/2014 | Swaminathan |

OTHER PUBLICATIONS

"Notice of Allowance", U.S. Appl. No. 13/563,494, dated Apr. 14, 2014, 6 pages.

* cited by examiner

SYSTEM AND METHOD FOR LOCAL GENERATION OF STREAMING CONTENT WITH A HINT TRACK

RELATED APPLICATION

This application claims priority under 35 U.S.C. Section 120 as a continuation of U.S. patent application Ser. No. 13/563,494, filed Jul. 31, 2012, and titled "System and Method for Local Generation of Streaming Content with a Hint Track," the entire disclosure of which is hereby incorporated by reference.

BACKGROUND

Consumption of electronic content within a computing environment is a rapidly growing field presenting numerous challenges.

To combat unauthorized consumption of content, some content owners have adopted an approach to protecting their content known as digital rights management ("DRM"), which may include various techniques for limiting access of electronic content to authorized individuals and/or enforcing other restrictions on the use of such content. Typically, clear content that is to be protected by DRM is encoded and packaged into an encrypted form. At packaging time, the packaging unit responsible for packaging content may utilize various types of encryption algorithms for encrypting content. In some cases, these encryption algorithms may encrypt content based on a cryptographic key, which may be selected or generated in a random fashion. At some point, the encrypted content may be provided to an electronic device associated with a content consumer. For instance, the consumer may pay a one-time fee or a recurring subscription fee to access the content electronically. To view the content in unencrypted form on the consumer's electronic device, the device may be required to obtain a respective content license that includes the correct cryptographic key for decrypting the content.

In some cases, decryption schemes and/or content formats may vary across consumer devices or platforms. These differences may be accommodated at packaging time. For instance multiple different encryption and formatting schemes may be applied to clear content to generate multiple different content versions that are compatible with different consumer devices or platforms.

Embodiments of a system and method for local generation of streaming content with a hint track are described. Embodiments of the system and method for local generation of streaming content with a hint track may be configured to utilize a hint track to ensure that the same content may be consumed on multiple different device types, platforms, operating systems, configurations, etc. Generally the hint track may include the requisite information needed to convert (e.g., transcode) a content item from one format to another. In some cases, mobile devices (e.g., smartphones and tablets) with different operating systems may require that content reside in different formats for successful consumption of the content on the respective devices. For instance, one type of device may require certain types of content to be in a streaming format whereas other types of devices may accommodate both streaming and non-streaming formats.

Accommodating different device configurations may include generating and storing multiple versions of the same content. For instance, a movie might be generated in multiple different formats to accommodate multiple different device configurations, and generating each different version of the same content may consume time and/or computing resources. Additionally, content servers may need to store multiple different versions of the same content to accommodate multiple different device types that may be requesting the content. Generally, accommodating multiple different device configurations in this way leads to a significant amount of redundancy for the various phases of content generation, content storage, and content delivery.

Embodiments described herein may include a hint track storing the requisite information to convert a non-streaming format of content to a streaming format. For instance, for packet-based streaming formats (e.g., MPEG-2), the hint track may store packet header information and offset information for locating encrypted media data within encrypted samples of media content. As described in more detail herein, information of the hint track may be used to reconstruct (without decryption) packets for local streaming to a media component responsible for decryption and playback.

Figure 1:
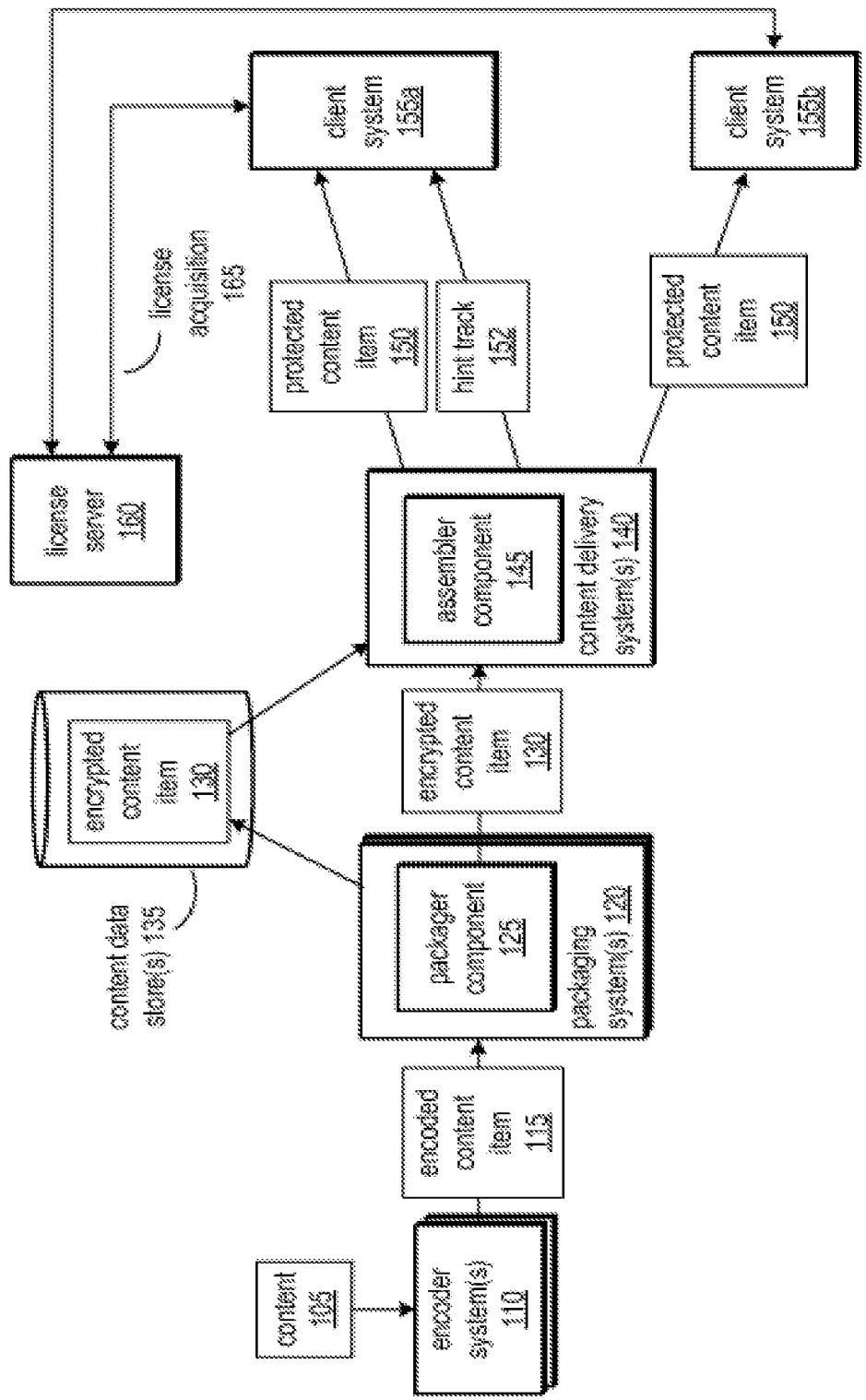
FIG. 1 illustrates block diagram of an example system in which a universal content format and hint track may be generated, according to some embodiments.

While the system and method for local generation of streaming content with a hint track is described herein by way of example for several embodiments and illustrative drawings, those skilled in the art will recognize that the system and method for local generation of streaming content with a hint track is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the system and method for local generation of streaming content with a hint track as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

Various embodiments of a system and method for local generation of streaming content with a hint track are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from a software program. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various embodiments include various encryption and/or decryption keys, any of which may be generated via a key derivation function (KDF). Key derivation functions may include the completion of one or more iterations or instances of cryptographic operations in order to generate an encryption or decryption key. Examples of key derivation function may include but are not limited to any key derivation functions specified by Public Key Cryptography Standards (PKCS) (e.g., PKCS-5 or PKCS-12) or Adobe® Password Security. In various embodiments, KDFs may be utilized by any of the various components described herein to generate encryption keys for symmetric encryption.

Various portions of this detailed description may refer to "client(s)" and "server(s)" or similar terminology. For instance, various embodiments may include (among other elements) a client system or client device (or simply a "client"). It should be understood that the terms "client" and "server" do not impose any limitation on the operation, configuration, or implementation of such elements. It should be understood that these terms are used only as convenient nomenclature. Indeed, various embodiments are need not be limited by the principles of a conventional client-server architecture.

In various instances, this detailed description may refer to content items (which may also be referred to as "content data," "content information" or simply "data" or "information"). In some instances, content items may include any information or data that may be licensed to one or more individuals (or other entities, such as business or group). In various embodiments, content may include electronic representations of video, audio, text and/or graphics, which may include but is not limited to electronic representations of videos, movies, or other multimedia, which may include but is not limited to data files adhering to Adobe® Flash® Video (.FLV) format or some other video file format whether such format is presently known or developed in the future. In various embodiments, the content items described herein may include electronic representations of music, spoken words, or other audio, which may include but is not limited to data files adhering to the MPEG-1 Audio Layer 3 (.MP3) format, Adobe® Sound Document (.ASND) format or some other format configured to store electronic audio whether such format is presently known or developed in the future. In some cases, content may include data files adhering to the following formats: Portable Document Format (.PDF), Electronic Publication (.EPUB) format created by the International Digital Publishing Forum (IDPF), JPEG (.JPG) format, Portable Network Graphics (.PNG) format, Adobe® Photoshop® (.PSD) format or some other format for electronically storing text, graphics and/or other information whether such format is presently known or developed in the future. In some embodiments, content items may include any combination of the above-described examples.

In various instances, this detailed disclosure may refer to consuming content or to the consumption of content, which may also be referred to as "accessing" content, "viewing" content, "listening" to content, or "playing" content, among other things. In some cases, the particular term utilized may be dependent on the context in which it is used. For example, consuming video may also be referred to as viewing or playing the video. In another example, consuming audio may also be referred to as listening to or playing the audio.

Figure 7:
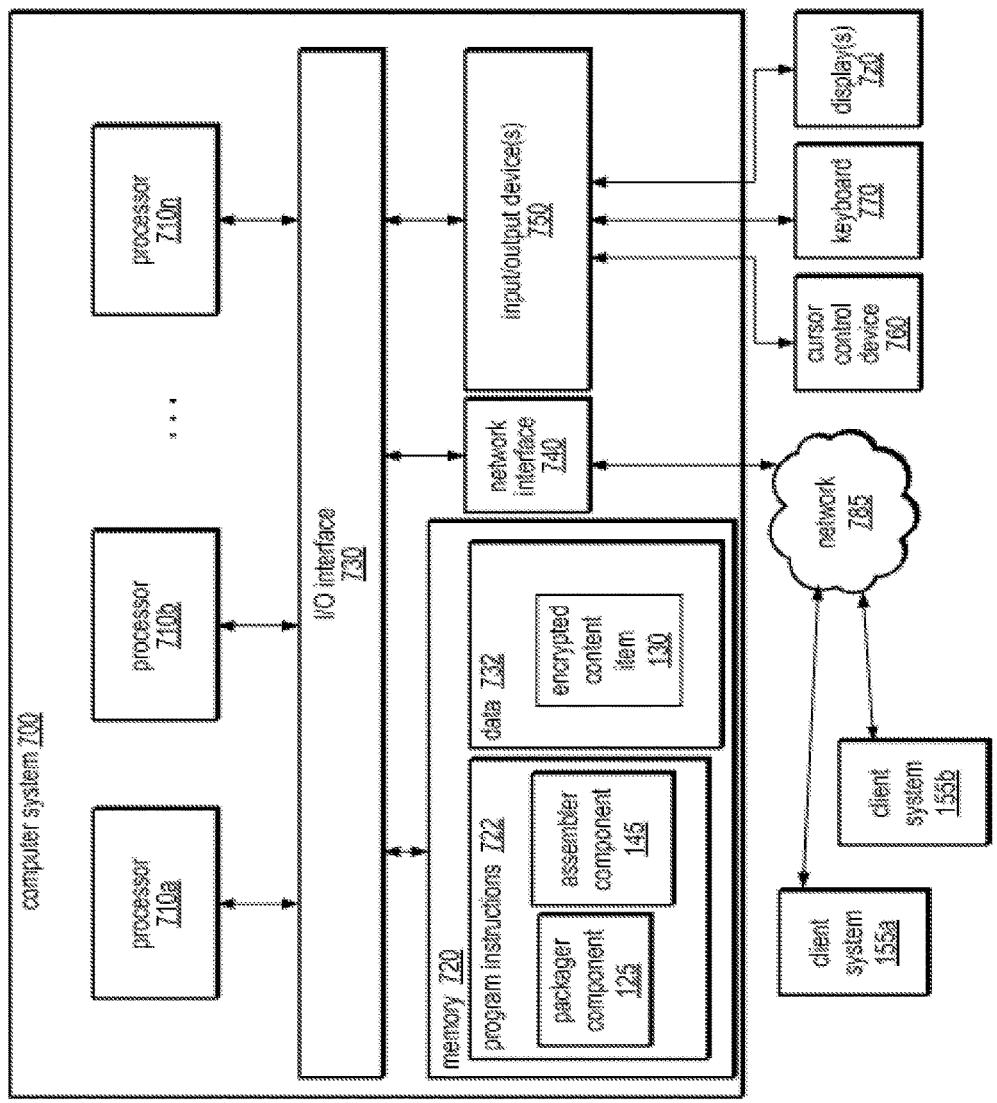
FIG. 7 illustrates an example computer system suitable for implementing various components of the system and method for local generation of streaming content with a hint track, according to various embodiments.

In various instances, this detailed description may refer to a devices configured to perform content consumption, such as client systems 155a-b. In various embodiments, such a device may include but is not limited to a computing system (e.g., a desktop or laptop computer), a set-top television box, a digital audio or multimedia player (e.g., an MP3 player), a personal digital assistant (PDA), a mobile phone, a smartphone, a touchscreen phone, an e-book reader, a digital photo frame, or any other device or system configured to access, view, read, write, and/or manipulate any of the content data described herein. Any of such devices may be implemented via a computer system similar to that described with respect to FIG. 7.

Note that in various instances the description presented herein may refer to a given entity performing some action. It should be understood that this language may in some cases mean that a system (e.g., a computer) owned and/or controlled by the given entity is actually performing the action.

Note that in various instances the description presented herein may refer to a public key being associated with a private key or a public key corresponding to private key. It should be understood that such statements may mean that such a public key forms a public key—private key pair with such a private key. Additionally, in some cases, a public key—private key pair may be referred to as simply a "key pair." Note that in various embodiments, public key—private key pairs may be generated via one or more key derivation functions, such as those described above.

Embodiments of the system and method for local generation of streaming content with a hint track may be configured to utilize a hint track to ensure that the same content may be consumed on multiple different device types, platforms, operating systems, programs, etc. This process is described in more detail below; generally the hint track may include the requisite information needed to convert (e.g., transcode) a content item from one type of format to another. In some cases, mobile devices (e.g., smartphones and tablets) with different operating systems may require that content reside in different formats for successful consumption of the content on the respective devices. For instance, one type of device may require certain types of content to be in a streaming format whereas other types of devices may play such content in streaming or non-streaming formats. Conventional techniques for accommodating different device configurations include generating and storing multiple versions of the same content. For instance, a movie might be generated in multiple different formats to accommodate multiple different device configurations, and generating each different version of the same content may consume time and/or computing resources. Additionally, content servers may need to store multiple different versions of the same content to accommodate multiple different device types that may be requesting the content. Generally, accommodating multiple different device configurations leads to a significant amount of redundancy for the various phases of content generation, content storage, and content delivery.

FIG. 1 illustrates a flow diagram of a framework in which various embodiments of the system and method for local generation of streaming content with a hint track. In the illustrated embodiment, content 105 may represent a media object, which may include any type of media program that may be represented and/or stored as electronic content (e.g., electronic representations of audio, video, images, presentations or some combination thereof). In various embodiments, a media program may include prerecorded content including but not limited to movies or motion pictures, television programs, video clips or snippets, audio productions, as well as live content including but not limited to content conveying real-time or near-real time events (e.g., a live sporting event or competition). One or more encoder systems 110 may be configured to input content 105 and generate an encoded content items 115 corresponding to content 105. In various embodiments, encoder systems may encode or compress content 105 according to one or more codecs or standards for video compression in order to generate encoded content item 115. One non-limiting example of such a standard includes the H.264 standard.

For clarity of illustration, only a single encoded content item 115 is presented in the illustrated embodiment. However, it should be understood that the illustrated system may create multiple encoded content items. For instance, in various embodiments, different encoded content items may represent different temporal segments of the same media object. For example, if the media object were a movie, each encoded content item may represent a different temporal segment of that movie. Each temporal segment may be specified by a different time period of the movie, a different set of frames within the movie or a different scene within the movie, for example.

In the illustrated embodiment, encoded content item 115 may be processed by a packager component 125. In various embodiments the packager component may be implemented on a packaging system 120, which may in some cases be implemented by a computer system, such as that illustrated in FIG. 7 described below. As illustrated, the packager component 125 may package and encrypt encoded content item 115 to generate a corresponding encrypted content item 130. Additional details of the manner in which encrypted content items 130 are generated are described below with respect to FIGS. 2-3. Generally, to support different client systems having different platforms or configurations, packager component 125 may be configured to generate a single encrypted content item 130 that may be assembled into a format that can be interpreted by different client systems or devices having different configurations. This format may be referred to herein as a "universal format," which may be a version of content that may be consumed on multiple device configurations. In some cases the universal format of content may be augmented by a hint track for assisting in manipulating the content into the proper structure on the client side. Note that the phrase universal format is used herein as a term of convenience for content structured for content consumption on multiple different devices; it is not intended to imply that the universal format is consumable on every possible device or system. Also note that in various embodiments, the universal format of content may be generated without encrypting the content multiple times. As described in more detail below, the manner in which packager component 125 generates the encrypted content item may save time and/or processing resources because embodiments may require only one instance of decryption to support the universal format that is consumable on different client types. In another example, the manner in which packager component 125 generates the encrypted content item may save storage resources (or reduce utilization of existing storage resources) by consolidating what would otherwise be multiple client content formats into a common encrypted content format stored server-side.

In various embodiments, the encrypted content item 130 may be provided directly to content delivery system(s) 140 and/or stored in a content data store(s) 135. In one non-limiting example, live or near live content (e.g., content for a live sporting event) may be provided to content delivery system(s) 140 whereas other content may be stored in content data store(s) 135 and retrieved by content delivery system(s) 140 at a later time. Once assembler component 145 receives the encrypted content item 130, the assembler component may assemble the encrypted content item into a universal format that is consumable on both client systems 155a-b. In various embodiments, the content delivery systems may also generate a hint track for a protected content item adhering to the universal format. In some cases, the hint track may be a part of the protected content item. In other cases, the hint track may be a separate data item. Use of the hint track to construct streaming data from a downloaded file is described in more detail below with respect to FIG. 4.

In the illustrated embodiment, only two client systems 155a-b are presented for clarity of illustration. It should be understood that in various embodiments, any number of client systems or devices may be supported. Non-limiting examples of these client devices include smartphones, tablet devices, laptop computers, notebook computers, and desktop computers. As illustrated, each client system 155a-b may be provided with a common version of the protected content item 150. In the illustrated embodiment, the hint track 152 is illustrated as being provided to client system 155a but not client system 155b. This is merely an example situation. In some cases, client system 155b may also receive the hint track and/or the hint track may already be included within protected content item 150 received by client system 155b.

To obtain the decryption key for decrypting a protected content item, each client system may perform a license acquisition 165 with license server 160. For instance, each encrypted content item may have a metadata portion that points to a license server and/or an appropriate protocol for carrying out license acquisition. If the server authenticates the respective client system, the server may issue the content license to the client system at 165. The content license may include a content encryption key that may be used to decrypt the protected content item received by that client system. In various embodiments, the client system may use this same content encryption key to decrypt subsequent protected (e.g., encrypted) content items. Of course, in various embodiments, decryption keys may change over time and license acquisition can be performed again when this happens. In other embodiments, other techniques for protecting the content encryption may be utilized. For instance, in some embodiments, when the client receives the content license, the content license may already include the content encryption key protected (e.g., encrypted) for that particular client.

Figure 2:
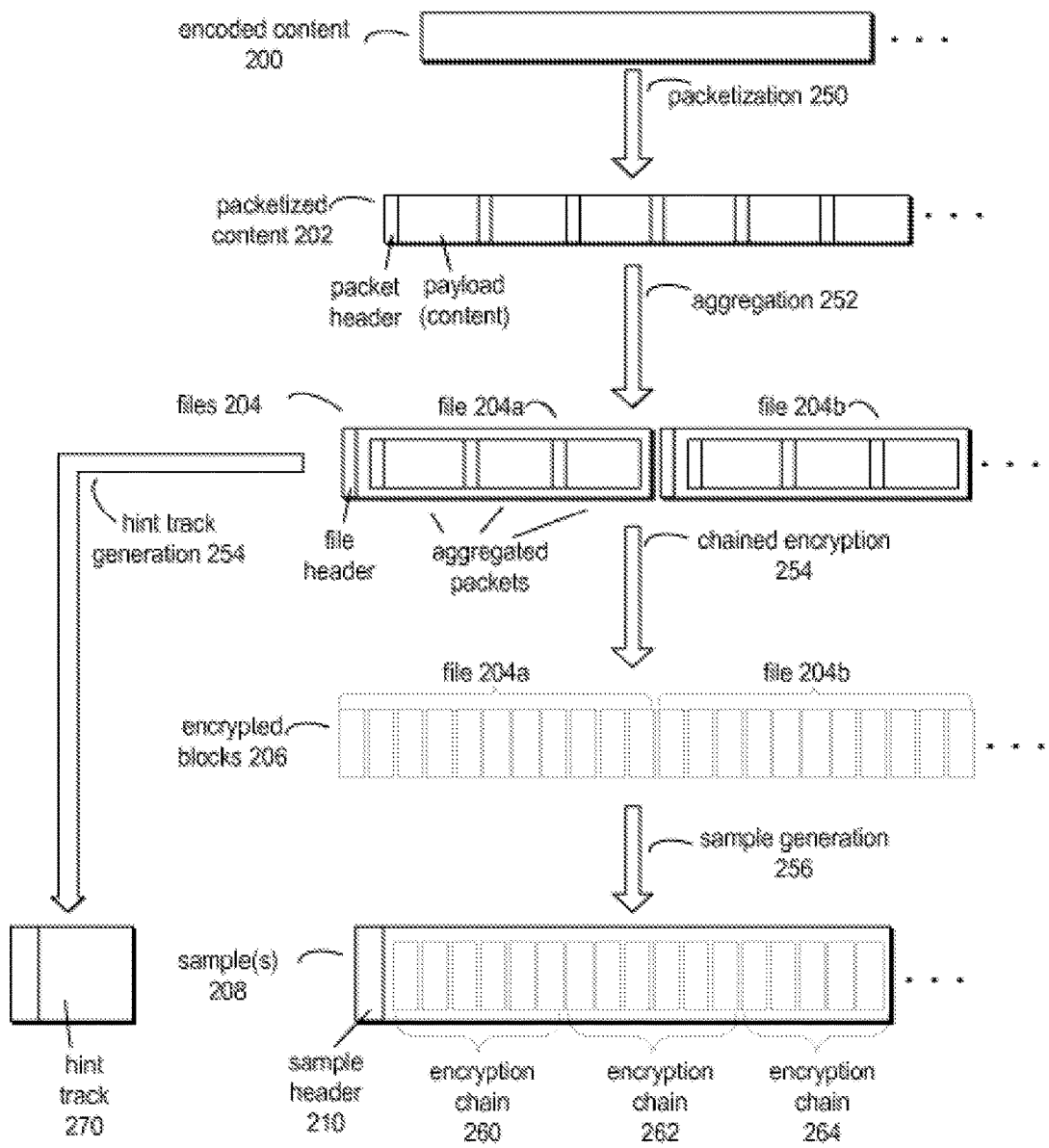
FIG. 2 illustrates an example flow diagram for the creation of a universal content format and hint track, according to some embodiments.

FIG. 2 illustrates an example process for generating universal format of content without redundant encryption and storage of the content. In various embodiments, the illustrated process may be performed by packager component 125 and/or assembler component 145 described above. In various embodiments, the illustrated process may be implemented on a computer system, such as computer 700 of FIG. 7. As illustrated at packetization 250, encoded content 200, such as encoded content item 115 of FIG. 1, may be packetized into packetized content 202. In some embodiments, packetizing may include parsing the encoded content into packets, each of which may include packet header information and a packet payload that includes content. In one non-limiting example, packetizing the encoded content may include generating a transport stream (TS) according to one or more standards, such as the MPEG-2 standard. In other cases, other standards or formats may be utilized to packetize the content. As illustrated at 252, an aggregation process may be performed in which sets of packets may be grouped into disparate files 204. In various embodiments, such files may be sized to provide streaming-like performance when such content is provided to a client system over one or more networks. For instance, the files may be large enough to house multiple packets but small enough such that multiple Hypertext Transfer Protocol (HTTP) requests may be submitted by a client system in order to obtain the files in a streaming-like fashion. In the illustrated embodiment, only two files 204a-b are presented for clarity of illustration. However, it should be understood that in various embodiments the packetized content may be grouped into any number of files. In some embodiments, grouping the packetized content into different files 204 may be optional.

Note that the media transport streams described herein (and associated header and payload information of that stream) may be different than a stream of network packets. For instance, whether content is packetized into a media transport stream (e.g., according to MPEG-2) may be independent of whether that content has been packetized according to a network protocol for transporting packets (e.g., Transmission Control Protocol (TCP), Internet Protocol (IP), etc.). For instance, in some cases, content that is packetized according to a media transport stream may or may not be additionally packetized for network transport according to a network protocol. In other cases, content that is not packetized according to a media transport stream (e.g., sample-based content) may or may not be packetized for network transport according to a network protocol. It should be understood that packetization according to media transport stream protocols and packetization according to one or more network protocols may occur at different levels of standard network models (e.g., different levels of the Open Systems Interconnection (OSI) model).

Figure 3:
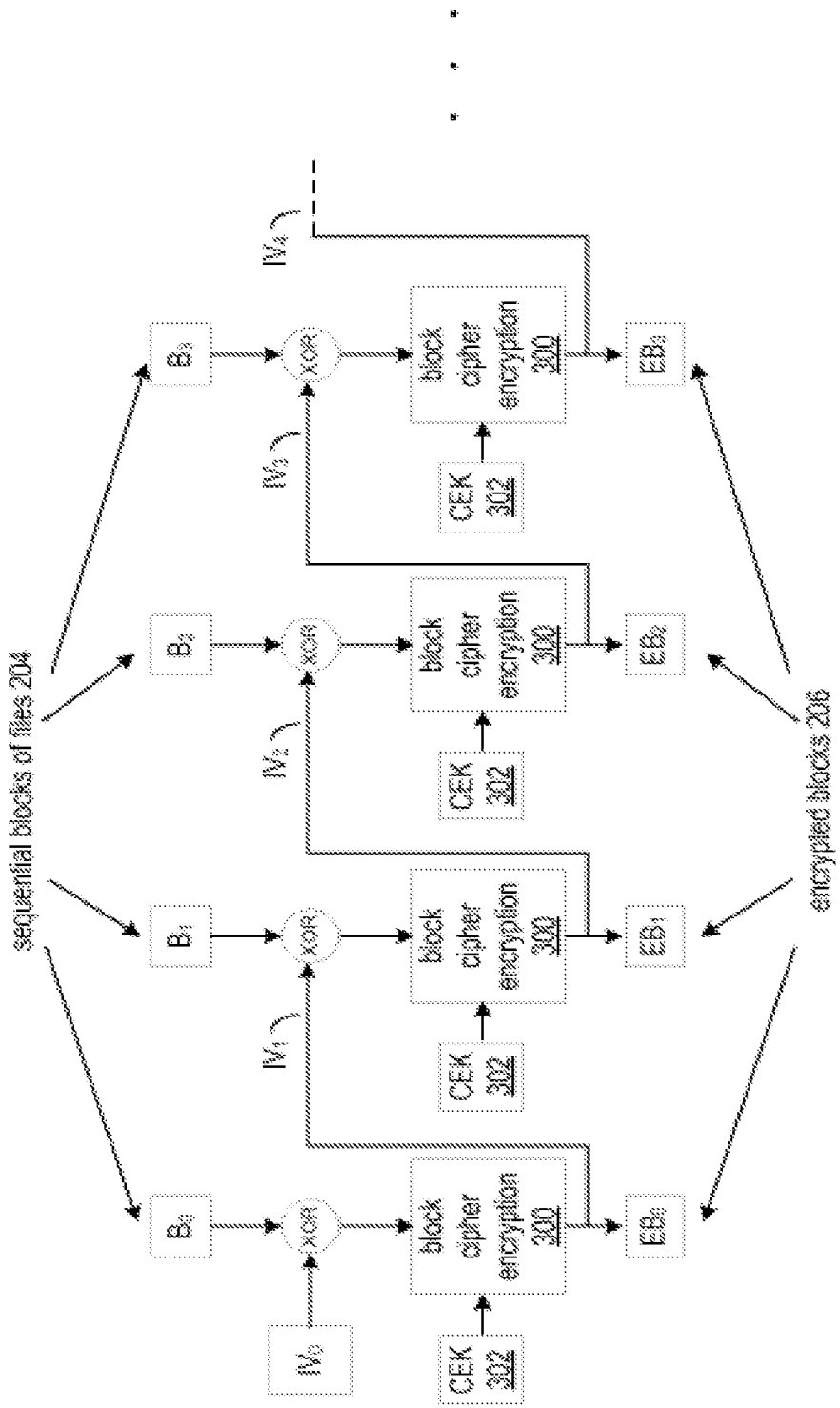
FIG. 3 illustrates one example of a chained encryption process performed on multiple blocks of content, according to some embodiments.

As illustrated at 254, a chained encryption process may be performed on files 204 to create multiple encrypted blocks 206 that represent the files. Referring collectively to FIGS. 2 and 3, the chained encryption of files 204 is described in further detail. FIG. 3 illustrates one example of chained encryption. As illustrated, files 204 may be parsed into a series of blocks. In various embodiments, these blocks may have a fixed width (e.g., 128 bits) dependent upon the type of encryption performed. In some embodiments, the encryption utilized may be Advanced Encryption Standard 128 bit Cipher-block chaining mode (AES-128 bit CBC mode) encryption. In other cases, other types of chained encryption may be utilized. In the illustrated embodiment, encryption may be generally performed in a sequential manner from the left to right of the Figure beginning with the first block $B_0$ and first initialization vector $IV_0$. In various embodiments, the first initialization vector IV0 may be randomly or pseudo-randomly generated. However, as described in more detail below, initialization vectors for subsequent blocks may be generated such that the encryption of each subsequent block is dependent upon the previously encrypted block. In the illustrated embodiment, initialization vector $IV_0$ (which may be the same width as the block to be encrypted) and the first block to be encrypted $B_0$ may be processed by a bit-wise exclusive- or operation. In other cases, other logic operations may be utilized in place of the exclusive- or operation. The result of the exclusive- or operation may be encrypted with a content encryption key 302 using block cipher encryption 300. The result may be an encrypted block $EB_0$ having a size equal to that of the input block (e.g., 128 bits in this example).

In various embodiments, each subsequent block may be encrypted such that it is chained to the previous block. In other words, to encrypt (and thus also to decrypt) a given block, the encryption mechanism may be required to have knowledge of the previous encrypted block, according to some embodiments. The manner in which this aspect is implemented in various embodiments includes, for a given block, using the previous encrypted block as the initialization vector for the encryption of the given block. For instance, in the illustrated embodiment, the first encrypted block $EB_0$ may also be used as the second initialization vector $IV_1$. Similar to the encryption of the first block, an exclusive- or operation may be performed on $IV_1/EB_0$ and the second block $B_1$, the result of which may be encrypted by block cipher encryption 300 using content encryption key 302. The above described processes may be repeated as illustrated in order to encrypt all blocks of files 204. Returning to FIG. 2, these encrypted blocks are illustrated as encrypted blocks 206, which may represent encrypted versions of files 204a and 204b.

As illustrated at 256, content samples may be generated from encrypted blocks 206. In various embodiments, a content sample may correspond to a defined portion of content, such as an audio or video frame. However, in some embodiments, a sample may correspond to some other granularity of the content. As noted above, encrypted files 206 may be an encrypted version of files 204, which may include both content information (e.g., data representing the actual content, such as audio or video data) as well as non-content information, such as packet header (e.g., a transport header, such as that defined by the MPEG-2 standard or another standard defining a media transport stream) or file header information. However, in various embodiments, such non-content information may serve no meaningful role within the context of a sample-based file format that is not packetized or formatted according to the format of files 204. For various reasons (e.g., to avoid unnecessary overhead within the sample-based content 208), sample generation 256 may extract the encrypted blocks 206 that correspond to actual content information while disregarding non-content information. The extracted blocks may be assembled into a sample 208 as illustrated. While only one sample is presented for clarity of illustration, it should be understood that multiple samples may be generated in various embodiments. In various embodiments, this extraction process, by virtue of discarding some or all of the encrypted blocks 206 that correspond to non-content information, may break the encryption chain(s) described above. For instance, performing block-based decryption on the blocks of a sample that omits one or more of blocks 206 may result in an incorrect determination of initialization vectors (e.g., since initialization vectors may be dependent upon previous blocks) and thus an incorrect decryption result. However, in various embodiments, this situation may be avoided by storing the appropriate initialization vectors in the illustrated sample header 210 of one or more of the samples. For example, sample 208 is illustrated as including three different sets of encrypted blocks denoted as encryption chains 260, 262, and 264. In various embodiments, while the content of these encrypted blocks may represent a contiguous (or near contiguous) portion of content, there may exist encryption boundaries where the encryption is non-continuous (e.g., due to broken chains during the extraction of content blocks from encrypted blocks 206). Accordingly, for the first block of each encryption chain 260-264 in a given sample, the sample generation process may store the initialization vectors necessary to start the chained decryption of each chain within the sample header of that given sample. In this way, when a decryption process (e.g., on the client system) encounters an encryption boundary between the encryption chains, the encryption process may access the appropriate initialization vector from the sample header and decryption may resume.

In various embodiments, the sample generation process may select the initialization vectors that are included in the sample header through a variety of techniques. In one example, when analyzing encrypted blocks 206, for each content block that is immediately preceded by a non-content block (e.g., a block containing non-content information, such as packet header or file header information), the sample generation process may store that non-content block as an initialization vector within the sample header of the sample being generated. The initialization vectors stored in the sample header may be utilized to decrypt different chains of encrypted blocks in the respective sample. In some cases, the initialization vectors may be stored within the sample and discarded post-decryption.

Figure 4:
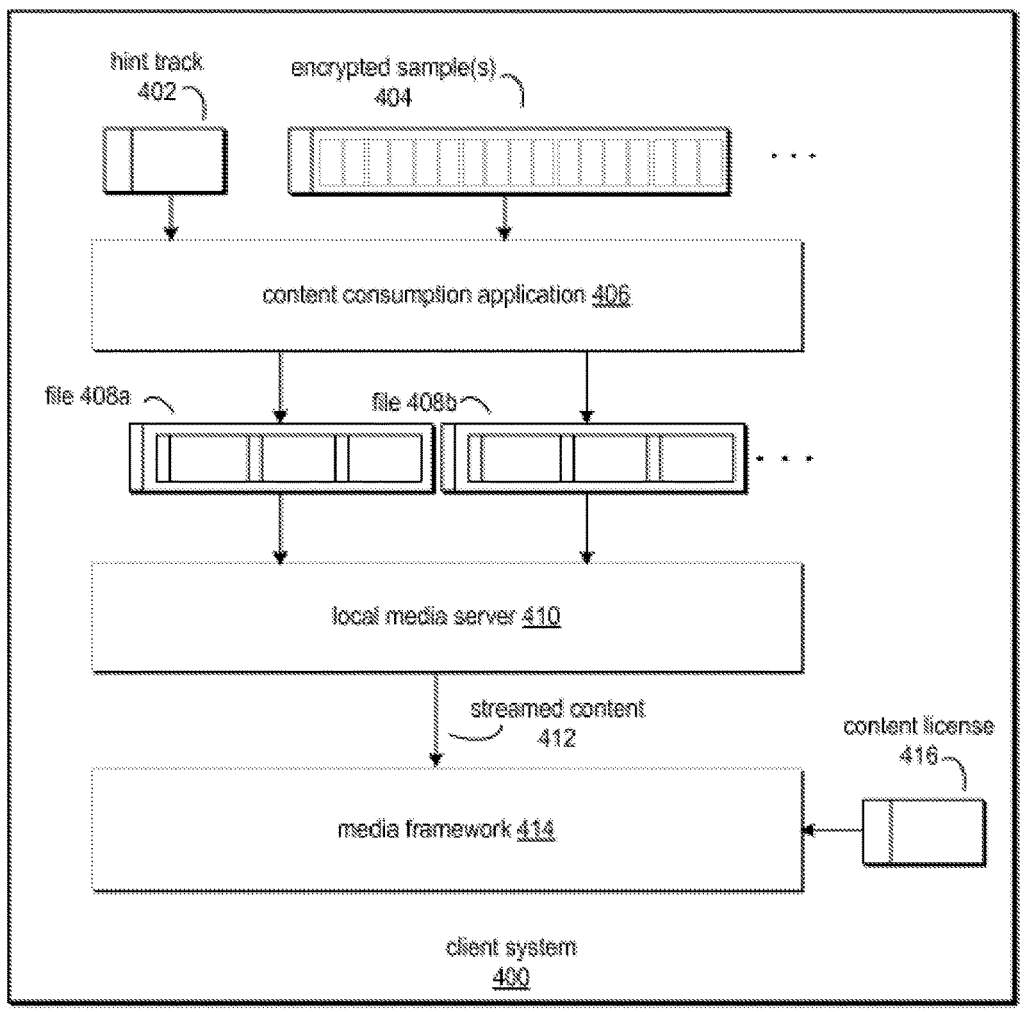
FIG. 4 illustrates a block diagram of an example client system, according to some embodiments.

In various embodiments, the illustrated process may also include hint track generation 254 resulting in a hint track 270. Generally, hint track 270 may include some or all of the requisite information needed to regenerate packetized content 202 and/or files 204 from sample(s) 208, with the exception that the payload (e.g., content) remains encrypted. This conversion process is described in more detail below with respect to FIG. 4. In various embodiments, hint track generation 254 may include storing packet the packet headers and/or any other non-payload (e.g., non-content) data within hint track 270. In various embodiments, hint track 270 may also include, with reference to sample(s) 208, the data offsets for the encrypted payload information from packetized content 202 and/or files 204. These offsets may specify the bit location of the payload information within sample(s) 208. FIG. 4 describes the process of using a hint track to regenerate the packetized content from sample(s) 208 in more detail; generally the packet header information may be extracted from the hint track and the encrypted payload data may be extracted from sample(s) 208. In various embodiments, the hint track may also include a manifest file specifying the structure of packetized content and/or files encapsulating the packetized content. In other cases, the manifest file may be separate from the hint track. The packet header information (and/or the manifest file) from the hint track and the encrypted packet payload data from sample(s) 208 may be used to reassemble a version of packetized content 202 and/or files 204, with the exception that the payload (e.g., content) remains encrypted.

FIG. 4 illustrates an example client system configured to consume data of the universal format described above, according to various embodiments. In the illustrated embodiment, client system 400 may be implemented by a computer system or other electronic devices, such as those described below with respect to the computer system of FIG. 7. In various embodiments, the client systems described above (e.g., client systems 155*a*-155*b*) may be configured in a manner similar to that of client system 400.

As illustrated, client system 400 may receive a hint track 402 and one or more encrypted samples 404, which may be configured in a manner similar to the samples described above. For example, client system 400 may receive multiple samples that represent audio and/or video frames, such as frames representing a media program (described above). For clarity of illustration, only one sample 404 is illustrated in FIG. 4. However, it should be understood that in various embodiments, the decryption and consumption techniques described below may be performed on multiple samples. In the illustrated embodiment, hint track 402 and encrypted sample(s) 404 may be generate in a manner similar to that of hint track 270 and sample(s) 208, respectively, as described above with respect to FIG. 2.

Client system 400 may include a content consumption application 406 which may be, for example, a media application configured to utilize media framework 414 to consume (e.g., play) content on client system 400. In one example, content consumption application 406 may be an application downloaded onto client system 400 from an external source, such as an application marketplace. In one non-limiting example, content consumption application 406 may be an application configured to play video content subject to one or more DRM policies.

In some embodiments, media framework 414 may require certain content types to be presented in a streaming format. From the hint track and encrypted samples, content consumption application 406 may be configured to generate a version of the content that may be interpreted and consumed by the media framework. For instance, content consumption application 406 may be configured to generate one or more files 408 (e.g., files 408*a*-*b*) that include packetized content data. In one non-limiting example, the packets of such data may adhere to the format of a transport stream of the MPEG-2 standard. In various embodiments, content consumption application 406 may extract all non-content information (e.g., header information) for the files and/or the packets within the files from hint track 402. For the content information (e.g., the packet payloads), content consumption application 406 may extract an encrypted version of the content information from encrypted sample(s) 404 in accordance with hint track 402. For example, for a given packet of to be generated, the content consumption application 406 may determine from which portion of the encrypted sample(s) 404 to extract the encrypted packet payload (e.g., encrypted media content) using location information from hint track 402. For instance, hint track 402 may include bit or byte offsets for locating packet payloads within encrypted content sample(s). The files 408 that are generated may be similar to files 204 described above, with the exception that the packet payloads within the files may be encrypted. Content consumption application 406 may provide files 408 to local media server 410, which may provide the files as streamed content 412 to the media framework 414. In one non-limiting example, streamed content 412 is provided from the local media server to the media framework in accordance with the HTTP Live Streaming protocol. In some embodiments, from the perspective of the media framework 414, streamed content 412 appears no different than an equivalent stream sent by a remote media server. In various embodiments, the streamed content may be pushed from the local media server to the media framework. In other cases, the media framework may fetch the streamed content from the local media server.

In various embodiments, media framework 414 may be configured to receive streamed content 412 and determine that the portions of the streamed content (e.g., the portions corresponding to packet payloads including media content) are encrypted and require decryption. To decrypt these portions of streamed content 412, media framework 414 may be configured to acquire a content license 416, which may include a content decryption key for decrypting the encrypted portions of streamed content 412. The media framework may perform the license acquisition using techniques similar to those described above with respect to FIG. 1 (e.g., license acquisition 165). Media framework may use the decryption key from the license to decrypt and consume (e.g., playback) the content on the device. In some embodiments, the content license and/or key may be obtained by content consumption application 406 and passed to media framework 414. In some embodiments, the content license may also specify one or more usage rights for the content, which may be enforced by media framework 414. In some embodiments, media framework 414 may utilize hardware-based decryption components for decrypting streamed content 412. In some embodiments, media framework 414 may also utilize hardware-based playback components for consuming streamed content 412. Representations of the streamed content may be generated on a display and/or audio output, such as those of the computer system of FIG. 7 described below.

By utilizing the techniques described herein, embodiments may utilize logic on the client side to generate streaming content compatible with media framework 414 while at the same time retaining the rights (e.g., DRM rights and policies) associated with encrypted sample(s) 404. Furthermore, utilizing the client side logic described herein, embodiments may accommodate different device configurations with the same universal format for content, which may save storage costs on servers and content delivery systems as multiple version of the same content do not need to be stored for different devices.

In some embodiments, streamed content may include a manifest file that specifies the location of the license server. Media framework 414 may be configured to acquire the content license from that license server according to one or more security protocols for license acquisition.

In various embodiments, media framework 414 may start and continue playback of streamed content 412 even while the content consumption application 406 is generating (e.g., transcoding or converting) files 408 based on encrypted sample(s) 404 and hint track 402. In various embodiments, at least some aspects of the downloading, transcoding, and playback of the content may be performed concurrently (e.g., in parallel). In some case, this concurrent processing may enable content playback to begin quickly without unnecessary delay.

In FIG. 4, note that the media content itself (e.g., packet payloads) remains encrypted until decrypted by media framework 414. By not decrypting the content prior to decryption by the media framework, embodiments may prevent a clear version of the content from being exposed in an unsecure environment. The embodiments described herein may provide a complete end-to-end DRM solution while also supporting the universal file format for the content. In various embodiments, media framework 414 may also include one or more hardware decryption components. By not decrypting the content prior to decryption by the media framework, embodiments may efficiently utilize the hardware decryption capability of media framework 414 (e.g., instead of using software decryption of content consumption application 406).

In some embodiments, instead of the hint track storing only non-content information (e.g., packet headers and offset information for locating packet payloads), the hint track may store actual content information (e.g., packet payloads and partial payloads) for reconstructing the packetized media. Content consumption application 406 may be configured to interpret such a hint track generated files 408 accordingly.

In some embodiments, the functionality described above with respect to content consumption application 406 and/or local media server 410 may be performed on a server upstream from the client. For instance, one or more servers of content delivery systems 140 may use a hint track to regenerate packetized content from content samples before providing that packetized content to the client. For example, instead of media framework 414 receiving streamed content 412 from local media server 410, the media framework may receive such content from a media server of content delivery systems 140, according to some embodiments.

Example Methods

Figure 5:
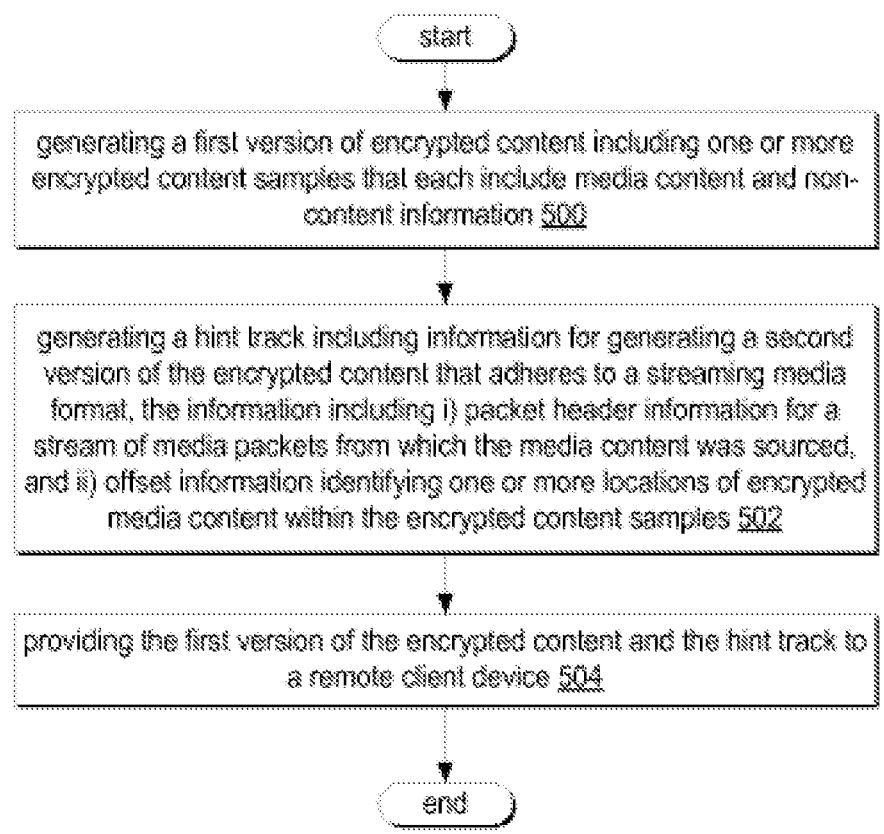
FIG. 5 illustrates a flowchart of an example method generating a first version of content and corresponding hint track, according to some embodiments.
Figure 6:
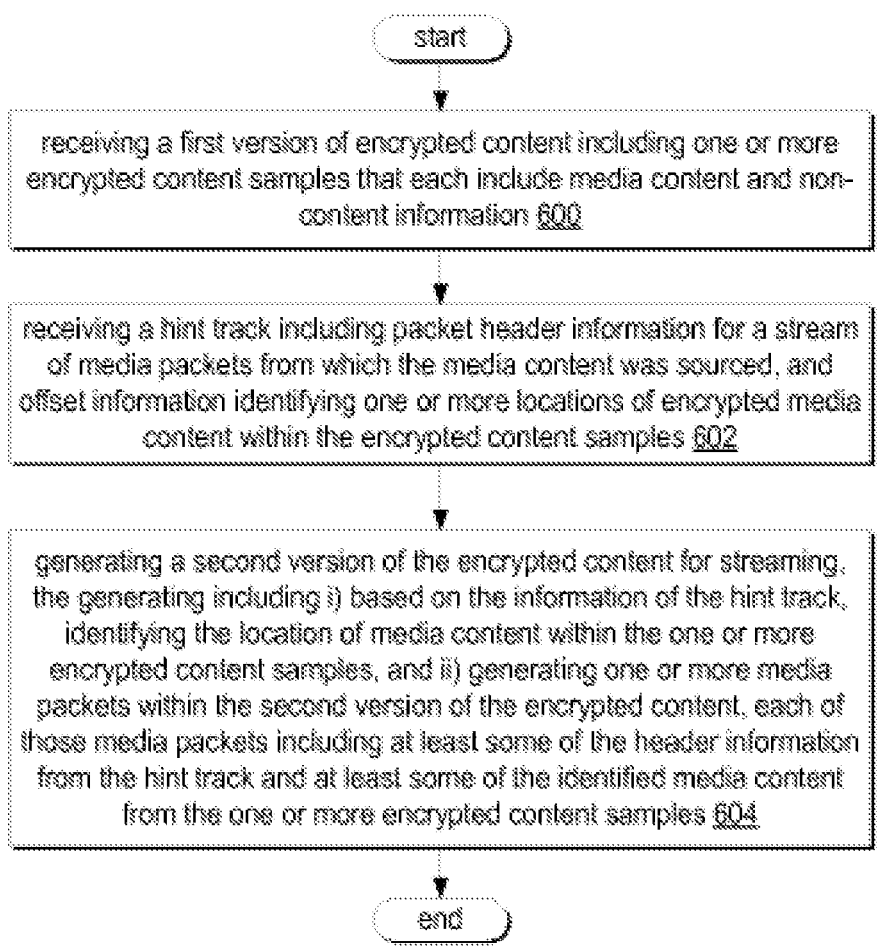
FIG. 6 illustrates a flowchart of an example method for local generation of streaming content with a hint track, according to some embodiments.

Embodiments of the system and method for local generation of streaming content with a hint track may include various methods performed by one or more computer systems or devices. FIGS. 5 and 6 illustrate examples of such methods. In various embodiments, the illustrated Figures may be implemented by components or systems described herein. In some embodiments, the methods described herein may be implemented on one or more computer systems, such as the computer system of FIG. 7 described below.

FIG. 5 illustrates an example method for generating a version of the encrypted content that may later, with information from the constructed hint track, be generated into a streaming format locally without decrypting the content prior to playback by a media component. In various embodiments, the method of FIG. 5 may be performed by one or more of the content delivery systems described herein (e.g., content delivery system(s) 140 of FIG. 1). As illustrated at block 500, the method may include generating a first version of encrypted content including one or more encrypted content samples that each include media content and non-content information. For instance, the method may include utilizing the techniques described above to generate one or more of the samples 208 or 404 described above.

As illustrated at block 502, the method may include generating a hint track comprising information for generating a second version of the encrypted content that adheres to a streaming media format. The information of the hint track may include packet header information for a stream of media packets from which the media content was sourced and offset information identifying locations of encrypted media content within said encrypted content samples. For instance, this portion of the method may include using the techniques described above to generate a hint track 270 or hint track 402.

As illustrated at block 504, the method may include providing the first version of the encrypted content and the hint track to a remote client device. For instance, this portion of the method may include utilizing the techniques described above to provide protected content item 150 and hint track 152 to client system 155*a*.

FIG. 6 illustrates an example method for generating a streaming version of content locally without decrypting the content prior to playback by a media component. In various embodiments, the illustrated method may be performed by client systems 155*a-b* and/or client system 400 of FIG. 4. As illustrated at block 600, the method may include receiving a first version of encrypted content including one or more encrypted content samples that each include media content and non-content information. For instance, this portion of the method may include utilizing the techniques described above to receive one or more of the samples 208 or 404 described above.

As illustrated by block 602, the method may include receiving a hint track including packet header information for a stream of media packets from which the media content was sourced and offset information identifying one or more locations of encrypted media content within the encrypted content samples. For instance, this portion of the method may include using the techniques described above to receive a hint track 270 or hint track 402.

As illustrated by block 604, the method may also include generating a second version of the encrypted content for streaming. The generating of the second version of the content may include, based on the information of the received hint track, identifying the location of media content within the one or more encrypted content samples. For instance, as described above, the hint track may include bit or byte offset information for locating media data within content samples. The generating of the second version of the content may include generating and inserting one or more media packets within the second version of the encrypted content; each of those media packets may include at least some of the header information from the hint track and at least some of the identified media content from the one or more encrypted content samples. For instance, the method may include extracting all non-content information for the packets from the hint track. For the content information (e.g., the packet payloads), the method may include extracting an encrypted version of the content information from the received encrypted sample(s). For a given packet of to be generated, the method may include identifying from which portion of the encrypted sample(s) to extract the encrypted packet payload (e.g., encrypted media content) using location information (e.g., offset information) from the hint track. For instance, the hint track may include bit or byte offsets for locating packet payloads within encrypted content sample(s). The packets that are generated may be similar to packetized content 202 described above, with the exception that the packet payloads within the files may be encrypted.

In various embodiments, the second version of the content for streaming may be streamed to a media framework, such as media framework 414 described above. From there the method may include utilizing the license acquisition techniques described above to acquire a license (including a content decryption key). The method may include decrypting the second version of the content in a secure environment and enforcing any rights of the license.

Secure Communication

In various embodiments, various elements of the illustrated framework may be associated with respective public key—private key pairs, such as key pairs utilized in Public Key Infrastructure (PKI). In the illustrated framework, a first element may securely transfer data to a second element by encrypting that data with the second element's public key. In this manner, only the second element will be able to decrypt the encrypted data to access the unencrypted data, according to various embodiments. For instance, since in various embodiments knowledge of the private key may be required to decrypt the data and since the second element may be the only element that has knowledge of its own private key, the second element may be the only element able to decrypt the data with the correct private key. Note that the aforesaid techniques may in various embodiments be utilized for any transfer of data within the system of FIG. 1. One example includes the "binding" of a content license to client system at license acquisition time. For example, the license server might obtain a public key for the client system and encrypt a content license with that public key prior to transferring the license to the playback device. In this example, only client system will be able to decrypt the license (since the playback device may be the only element with knowledge of the correct private key). In some embodiments, a given element may trust another element with knowledge of its private key (thereby allowing the other element to decrypt data encrypted with the given element's public key). In various embodiments, the public keys described herein may be obtained from a public key certificate, such as a certificate provided by a certificate authority (not illustrated) in PKIs. One example of such a certificate is an X.509 certificate (in other cases, other types of public key certificates may be utilized).

Example Computer System

Various embodiments of a system and method for local generation of streaming content with a hint track, as described herein, may be executed on one or more computer systems, which may interact with various other devices. One such computer system is computer system 700 illustrated by FIG. 7, which may in various embodiments implement any of the systems, devices, elements or methods illustrated in FIGS. 1-7. For instance, any of the functionality described above may be stored in memory as processor-executable executable program instructions 722 (e.g., program instructions executable by processor(s) 710). In one non-limiting example, instructions 722 may implement one or more packager components 125 or assembler components 145, as illustrated. In the illustrated embodiment, computer system 700 includes one or more processors 710 coupled to a system memory 720 via an input/output (I/O) interface 730. Computer system 700 further includes a network interface 740 coupled to I/O interface 730, and one or more input/output devices 750, such as cursor control device 760, keyboard 770, and display(s) 780. In some cases, it is contemplated that embodiments may be implemented using a single instance of computer system 700, while in other embodiments multiple such systems, or multiple nodes making up computer system 700, may be configured to host different portions or instances of various embodiments. For example, in one embodiment some elements may be implemented via one or more nodes of computer system 700 that are distinct from those nodes implementing other elements.

In various embodiments, computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments processors 710 may be general-purpose or embedded processors implementing any of a variety of instruction set architectures (ISAs), such as the x96, PowerPC, SPARC, or MIPS ISAs, or any other suitable ISA. In multiprocessor systems, each of processors 710 may commonly, but not necessarily, implement the same ISA.

System memory 720 may be configured to store program instructions 722 and/or data 732 accessible by processor 710. In various embodiments, program instructions 722 may be executable by the processor(s) to implement the functionality of any packaging component, assembler component, encryption component, decryption component, or client system described above. As illustrated, in various embodiments, data 732 may store one or more encrypted content items 130, from which other protected versions of the content may be generated or assembled. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the framework described above may be stored within system memory 720. In other embodiments, program instructions and/or data may be received, sent or stored upon different types of computer-accessible media or on similar media separate from system memory 720 or computer system 700.

In one embodiment, I/O interface 730 may be configured to coordinate I/O traffic between processor 710, system memory 720, and any peripheral devices in the computer system, including network interface 740 or other peripheral interfaces, such as input/output devices 750. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processor 710.

Network interface 740 may be configured to allow data to be exchanged between computer system 700 and other devices attached to a network (e.g., network 785), such as other computer systems (e.g., client systems 155a-b), or between nodes of computer system 700. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 750 may, in some embodiments, include one or more display terminals, keyboards, keypads, touchpads, scanning devices, voice or optical recognition devices, or any other devices suitable for entering or accessing data by one or more computer systems 700. Multiple input/output devices 750 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 740.

In some embodiments, the illustrated computer system may implement any of the process or methods described above, such as those of FIGS. 5 and 6. In other embodiments, different elements and data may be included.

Those skilled in the art will appreciate that computer system 700 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, set top television boxes, pagers, and/or any other electronic device described herein. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network and/or a wireless link. Generally speaking, a computer-accessible medium may include a computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of methods may be changed, and various elements may be added, reordered, combined, omitted, modified, etc. Various modifications and changes may be made as would be obvious to a person skilled in the art having the benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A method, comprising:
receiving a first version of encrypted content by a computing device comprising at least one encrypted content sample including media content and header information;
receiving, by the computing device, a hint track comprising:
packet header information for a stream of media packets from which the media content was sourced; and
offset information identifying at least one location of encrypted media content within the encrypted content samples; and
generating, based on the hint track information and by the computing device, a second version of the encrypted content using content from only the at least one encrypted content sample of the first version of encrypted content, the first version of encrypted content being a non-streaming format and the second version of the encrypted content being a streaming format.

2. The method of claim 1, wherein the generating the second version of the encrypted content comprises identifying the at least one location of encrypted media content within the at least one encrypted content sample and generating one or more media packets within the second version of the encrypted content, wherein each of the one or more media packets comprise at least some of the packet header information from the hint track and at least some of the identified media content from the at least one encrypted content samples.

3. The method of claim 1, wherein the generating the second version of the encrypted content is performed on a computer, and the method further comprises providing the second version of the encrypted content to a local server component of the computer.

4. The method of claim 3, further comprising streaming the second version of the encrypted content from the local server component to a media framework component of the computer.

5. The method of claim 4, further comprising decrypting the second version of the encrypted content with the media framework component.

6. The method of claim 5, further comprising acquiring a cryptographic key from a remote source and decrypting the second version of the content with the cryptographic key.

7. The method of claim 6, wherein the remote source is a license server, and the cryptographic key is acquired from the license server as a content license for the second version of the encrypted content.

8. The method of claim 4, further comprising starting and continuing playback of the second version of the encrypted content at the media framework component concurrently with streaming the second version of the encrypted content.

9. A method comprising:
generating, by a computing device, a first version of encrypted content in a non-streaming format, the first version of the encrypted content comprising at least one encrypted content sample including media content and header information;
generating a hint track containing header information, by the computing device, for generating a second version of the encrypted content in a streaming format;
sending the first version of the encrypted content and the hint track by the computing device for receipt by a client; and
causing the client to generate the second version of the encrypted content in the streaming format, based on the hint track, using encrypted content from only the at least one encrypted content sample.

10. The method of claim 9, wherein the header information comprises packet header information for a stream of media packets from which the media content was sourced and offset information identifying at least one location of encrypted media content within the encrypted content samples.

11. The method of claim 9, wherein the first version of the encrypted content and the hint track are sent to the client responsive to a request for the first version of the encrypted content.

12. The method of claim 9, further comprising generating a content license including a content decryption key for decrypting the second version of the encrypted content and sending the content license to the client.

13. A system comprising:
a memory;
a local server; and
at least one processor communicatively coupled to the memory storing program instructions that are executable by the at least one processor to perform operations comprising:
receiving a first version of encrypted content in a non-streaming format, the first version of the encrypted content comprising at least one encrypted content sample including media content and header information;
receiving a hint track comprising:
packet header information for a stream of media packets from which the media content was sourced; and
offset information identifying at least one location of encrypted media content within the encrypted content samples; and
generating, based on the hint track information, a second version of the encrypted content in a streaming format using content from only the at least one encrypted content sample of the first version of encrypted content.

14. The system of claim 13, wherein generating the second version of the encrypted content comprises identifying the at least one location of media content within the at least one encrypted content sample and generating at least one media packet within the second version of the encrypted content, wherein each of the at least one media packet comprises at least some of the packet header information from the hint track and at least some of the identified media content from the at least one encrypted sample.

15. The system of claim 13, further comprising providing the second version of the encrypted content to the local server.

16. The system of claim 15, further comprising streaming the second version of the encrypted content from the local server to a media framework component of the system.

17. The system of claim 16, further comprising decrypting the second version of the encrypted content with the media framework component.

18. The system of claim 17, further comprising acquiring a cryptographic key from a remote source and decrypting the second version of the content with the cryptographic key.

19. The system of claim 18, wherein the remote source is a license server, and the cryptographic key is acquired from the license server as a content license for the second version of the encrypted content.

20. The system of claim 19, wherein the content license specifies at least one usage right for the second version of the encrypted content that are enforced by the media framework component of the system.

* * * * *